United States Patent
Lorkowski et al.

(10) Patent No.: US 6,663,345 B2
(45) Date of Patent: Dec. 16, 2003

(54) ROTOR BLADE WITH CONTROL FLAPS

(75) Inventors: Thomas Lorkowski, Unterhaching (DE); Frank Hermle, Munich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/908,978

(22) Filed: Jul. 20, 2001

(65) Prior Publication Data

US 2003/0026696 A1 Feb. 6, 2003

(30) Foreign Application Priority Data

Jul. 20, 2000 (DE) .......................... 100 35 333

(51) Int. Cl.[7] .............................................. B64C 27/615
(52) U.S. Cl. ........................................................ 416/23
(58) Field of Search ................................ 416/3, 23, 24, 416/134 A, 164, 168 R; 244/17.25, 213, 214, 215, 219

(56) References Cited

U.S. PATENT DOCUMENTS 5,570,859 A * 11/1996 Quandt ..................... 416/23 X
6,481,964 B2 * 11/2002 Lorkowski et al. ........... 416/23
6,508,439 B1 * 1/2003 Fink et al. ................ 416/23 X

FOREIGN PATENT DOCUMENTS

EP 0947422 6/1999
GB 629690 7/1949

* cited by examiner

*Primary Examiner*—Edward K. Look
*Assistant Examiner*—Richard A. Edgar
(74) *Attorney, Agent, or Firm*—Crowell & Moring LLP

(57) ABSTRACT

Rotor blade for a helicopter having an aerodynamic control flap, particularly a camber flap, is integrated essentially in the contour of the blade profile. The camber flap is swivellably arranged on an axis of rotation and is linked to a control rod of a control device outside the axis of rotation, for converting a linear movement into a swivelling movement of the control flap. The control device is disposed by way of roller bearings and bolts aligned in the span direction. Devices are provided which absorb by way of the control flap centrifugal forces of the control device resulting from the rotation of the rotor blade.

25 Claims, 2 Drawing Sheets

ROTOR BLADE WITH CONTROL FLAPS

This application claims the priority of German Patent Document 100 35 333.9, filed in Germany, Jul. 20, 2000, the disclosure of which is expressly incorporated by reference herein.

The invention relates to a rotor blade for a helicopter having an aerodynamic control flap, particularly a camber flap, which is integrated essentially in the contour of the blade profile, is swivellably arranged on an axis of rotation and to which a control device, particularly a control rod, is linked outside the axis of rotation, for converting a linear movement into a swivelling movement of the control surface.

In comparison to conventional airplanes, helicopters have many advantages. The vertical starting and landing permits a maneuvering in locally limited areas. As a result of the ability to fly at a low speed, the helicopter can be used for monitoring tasks. The possibility of hovering predestines the helicopter as an operating device for rescue missions.

The vertical lift and propulsion is caused by the rotation of the rotor blades about the rotor mast in that the rotor blades generate a lift which is directed according to the position with respect to the rotor mast. The position of the rotor blades and thus the lift and the propulsion of the helicopter are normally ensured by the rotating of the rotor blades along an axis in the span direction by means of a wobble plate and a linkage of bars situated between the latter and the rotor blade. As an alternative, it is possible to influence the position of the rotor blades by way of control flaps. A swivelling of the control flaps results in a change of the approach flow behavior of the air.

In this case, servo flaps can be used as control flaps on the trailing edge of the profile in order to reduce the typical knocking noise of the rotor blades. This is caused by the interaction between the rotor blades and air vortices which are shed from the preceding rotor blade. Servo flaps are used in this area in order to reduce the aerodynamics of the interaction in that the vortices are diminished by a slight setting and attraction and are repulsed further toward the outside.

As a result of a lifting and lowering of a control flap mounted as a camber flap on the leading edge of the profile, the high suction peaks are reduced on the leading edge of the profile when the rotor blade is in a reverse motion, whereby the flow shedding is delayed in this phase and the hysteresis loops are reduced in the course of the aerodynamic coefficients. In addition, a discrete camber flap on the leading edge of the profile permits that the energy required in the case of a continuous contour variation for the elastic deformation be used for overcoming the aerodynamic forces and moments or that a greater authority of movement be provided.

From T. Lorkowski, P. Jänker, F. Hermle, S. Storm, M. Christmann, "Concept Development of a Piezoactuator-Driven Leading Edge Flap for the Dynamic-Stall Deceleration" Annual Conference of the DGLR, Sep. 27–30, 1999, a camber flap on the leading edge of the profile is known in the case of which the force of a piezoactuator is transferred by way of a forcing lever to a flap linking point. This linking point is situated above the axis of rotation of the camber flap, so that, by way of the lever arrangement, the flap is swivelled downward when the forcing lever is moved forward and is swivelled upward when the forcing lever is moved backward. According to the lever arm (distance between the flap linking point and the axis of rotation) and the path of the forcing lever, different displacements can therefore be achieved.

The problem of this type of an arrangement is the fact that, in the case of a simple mounting of the forcing lever at the flap linking point, because of the centrifugal forces of up to 1,000 g occurring during the operation and because of the load in the forcing lever, a tilting of a bearing will occur which will result in a limited operation. During one rotor rotation, the camber flap is moved back and forth several times, so that under the high loads, a wear of the components occurs in the case of a simple mounting. In addition to an increased energy input for the movement of the flap, this has the result that a tilting can occur even more rapidly because of the resulting increased play of the mounting.

It is therefore an object of the invention to provide a rotor blade having an aerodynamic control flap, in the case of which the flap can be controlled at high regulating speeds during the operation at a centrifugal force load of up to 1,000 g by means of a control device, without the occurrence of a tilting of the control device and of the control surface. For a low-maintenance design, the wear of the individual components should also be low.

For achieving this object, a rotor blade of the initially mentioned type according to the invention is characterized in that the control device is supported by way of roller bearings and bolts aligned in the span direction, and devices are provided which absorb by way of the control flap centrifugal forces of the control device, which result from the rotation of the rotor blade.

Because of the transmission of the kinetic energy of the control device to bolts which are supported by means of roller bearings, the risk of a tilting is lower than in the case of a simple point mounting. In addition, the centrifugal forces are absorbed by way of devices of the control flap so that, even in the event of different centrifugal force loads, a stable controlling of the control flap is ensured without play. Since the selected setting of the individual components of the control system with respect to one another is not changed, a tilting will be almost impossible. As a result, the wear of the individual components is also reduced.

In a preferred embodiment, the devices for absorbing the centrifugal forces comprises a thrust bearing mounted between the control device and the control flap, particularly of a thrust ball bearing and a spring which, under prestress, continuously presses the portion of the control device which is to be supported against the thrust bearing. As a result of the thrust bearing, the friction between the control flap and the area to be supported is reduced to a minimum, whereby less energy for moving the control flap has to be applied by the actuator system. The thrust bearing is advantageously a thrust ball bearing, but any bearings can be used which reduce the friction between the components. At low centrifugal forces, the spring prevents a bearing play of the thrust bearing and protects against a displacement of the thrust bearing. Thus, also at low centrifugal forces, no bearing play will exist and a tilting will be prevented. The spring is preferably mounted around the bolt so that this bolt prevents a slipping of the spring.

The transmission of the movement of the control device to the flap is preferably implemented by means of a housing. By means of this housing, the linear movement is transmitted by way of roller bearings integrated therein to a bolt. The mounting of the bolt on the control flap will than cause a swivelling of the control flap.

The bolt is advantageously screwed into flap-side bearing eyes. This permits an easy mounting and, if required, an easy exchange. Naturally, in the event of circumstances caused by special stress which require a welding or gluing, this will also be possible.

In another preferred embodiment, the devices for absorbing the centrifugal forces consist of a roller bearing ball situated in the face of the bolt, and of a hollow socket interacting therewith and force-lockingly connected with the control flap. Thus, by way of the bolt by means of which the linking to the control flap is ensured, the control device is supported with respect to them. The point bearing of the ball in the hollow socket has a low frictional loss and by nature has no bearing play.

The radius of the hollow socket is preferably selected to be larger than the radius of the roller bearing ball, elliptical sections also being conceivable. This ensures a smooth-working point bearing which prevents a displacement of the control bar linkage in the span direction which, during the movement, converts little energy into friction and heat.

The hollow socket advantageously consists of synthetic sapphire, while the roller bearing ball consists of steel. Naturally, it is also possible to use a hollow socket made of a different bearing jewel, such as ruby. This material also does not bond with the roller bearing ball during friction.

The transmission of the movement of the control device to the flap is caused in another advantageous embodiment by way of two bolts on a fork, whereby the control axis is interrupted. In this case, the bolts are disposed in the control flap by way of roller bearings. As a result, a space is created between the flanks of the fork which can be utilized in the low height of the rotor blade. For example, a housing can be mounted in the space according to another embodiment, whereby the housing is provided for the conversion of the movement of the control device in one direction, while a fork can be used for the conversion of he movement of the control device into the other direction.

The bolts can be welded or glued to the fork. However, advantageously, the bolts are screwed to the fork. If required, this ensures an easy exchange of the stressed components without the requirement of high repair expenditures.

The roller bearings are preferably sealed off on the side which is outside in the span direction by means of asymmetrical radial packing rings. As a result, the mass of the charged roller bearing grease is held back by the projected surface of the seal.

The roller bearings are preferably needle roller bearings.

The bearing eyes accommodating the hollow socket and the bolts or roller bearings are inserts which can be slid in a form-locking manner into bores/openings of the control flap during the assembly, for which their outer contour must be adapted to the bores. By means of other inserts and check nuts, these inserts can be precisely fixed and positioned in the control flap, so that the play of all bearings is minimized. In addition, a simple exchange will be possible, as required.

Other objects, advantages and novel features of the present invention will become apparent from the following detailed description of the invention when considered in conjunction with the accompanying drawings.

DETAILED DESCRIPTION OF THE DRAWINGS

Figure 1:
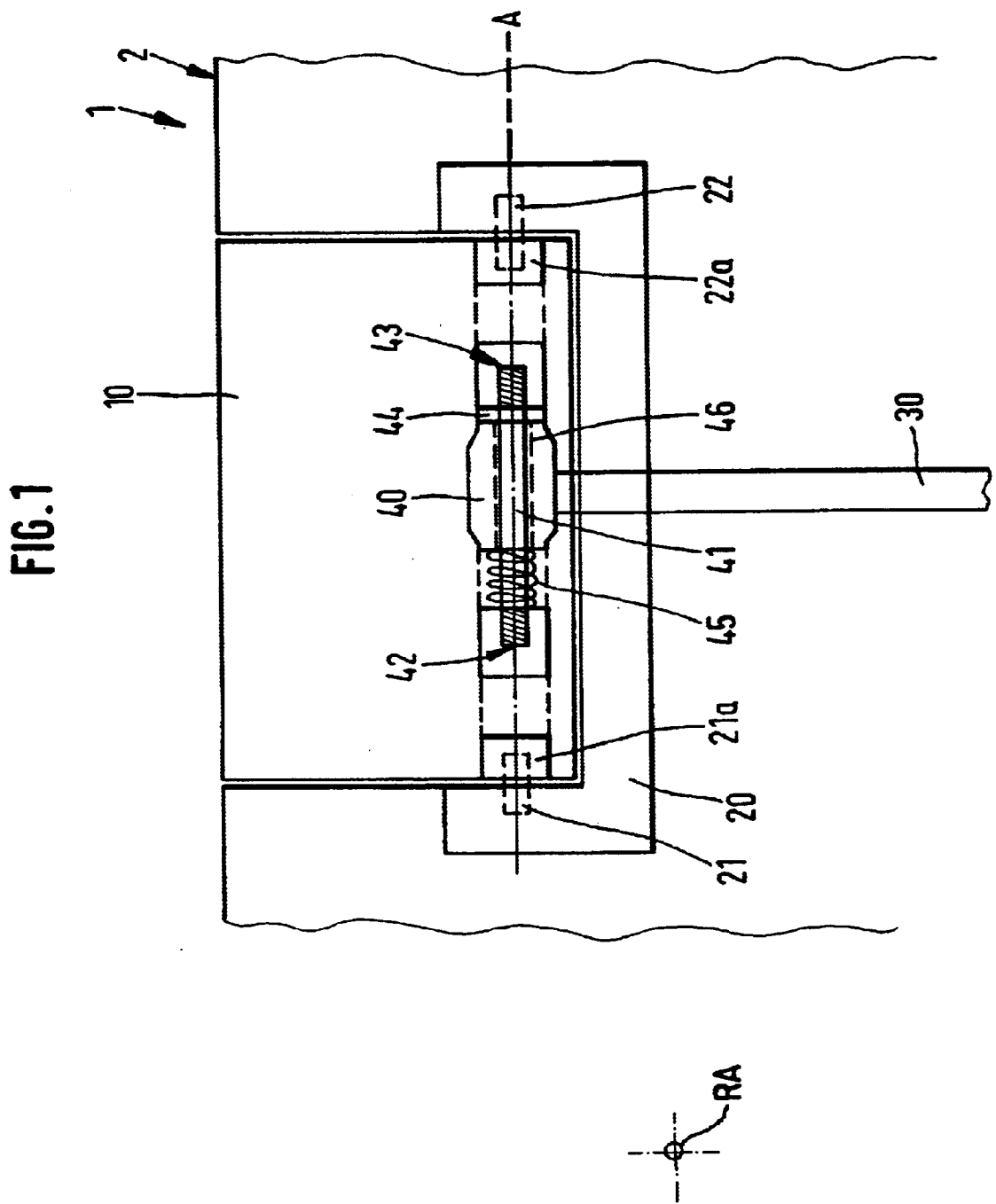
FIG. 1 is a schematic top view of a rotor blade having a control flap (camber flap) mounted on the leading edge of the profile and having a housing for transferring the movement of a control rod, also showing the components integrated in the rotor blade.
Figure 2:
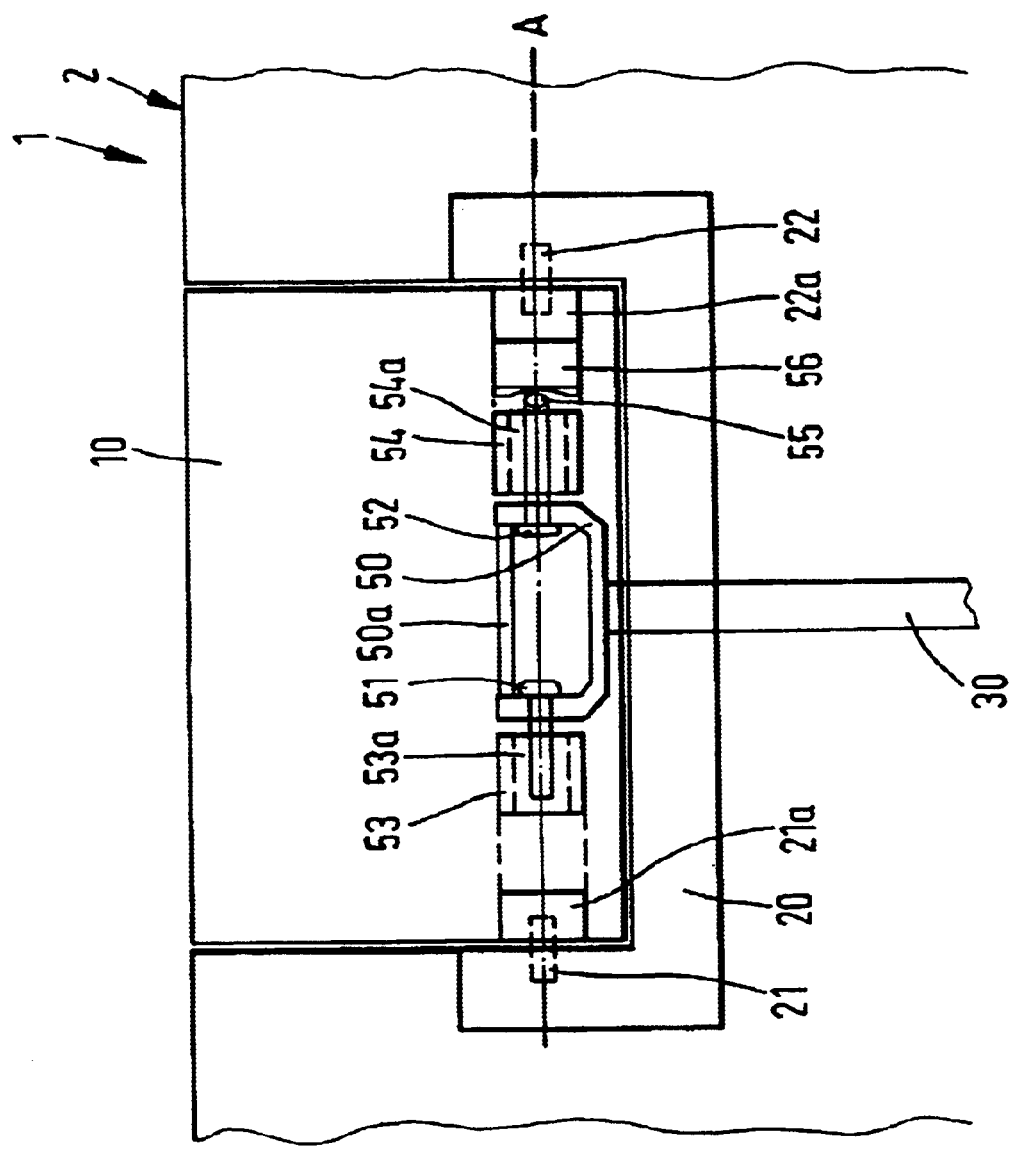
FIG. 2 is a schematic top view of a rotor blade having a control flap (camber flap) mounted on the leading edge and having a fork for transferring the movement of a control rod, also showing the components integrated in the rotor blade.

In drawing FIGS. 1 and 2, only a portion of the rotor blade 1 is shown. It is to be understood that the rotor blade in use rotates about a rotor blade axis RA schematically shown at the left side in the drawing FIGS. 1 and 2. Thus centrifugal forces act on the blade in a direction from left to right in the drawing figures during helicopter operation with a rotating blade.

In the case of the rotor blade 1 illustrated in FIG. 1, a camber flap 10 was integrated in the profile of the rotor blade 1 at the leading edge 2 of the profile. The contour of this camber flap 10 corresponds to the contour of the blade profile. In the present embodiment, the camber flap 10 is integrated in a frame 20 which is connected with the rotor blade 1. The camber flap 10 is swivellably disposed in the frame 20. For this purpose, the two pins 21, 22 form the swivelling axis. The pins 21, 22 are connected with the frame 20 in a force-locking manner. The camber flap 10 is disposed on the pins by way of bearings 21a, 22a. The linking axis A of the control rod 30 is situated above the swivelling axis of the camber flap 10. The control rod 30 is moved back and forth by an internal actuating system (not shown here). Because of the lever between the swivelling axis and the linking axis A, this results in a swivelling movement of the camber flap 10 in the upward direction or the downward direction. For transferring the longitudinal movement of the control rod 30 to the linking axis A, the control rod 30 is connected in a force-locking manner with the housing 40. A bolt 41 which absorbs the movement of the control rod 30 and transmits it to the camber flap 10 for the swivelling is situated in a needle bearing 46 in the housing 40. For this purpose, the bolt 41 is screwed to two bearing eyes 42, 43 connected with the camber flap 10. For eliminating the play and reducing the friction, a thrust ball bearing 44 is situated between the housing 40 and the bearing eye 43 situated on the outside in the span direction. The spring 45 placed around the bolt 41 has the effect that the housing 40 is pressed from the interior bearing eye 42 to the exterior bearing eye 43. As a result, a stable position is always ensured in the case of different centrifugal forces. The bearings of the axis of rotation, the receiving elements of the bearing eyes, and the thrust ball bearing are developed as inserts in this case which are pushed into a fitting bore (illustrated by a broken line). By means of spacer blocks and check nuts, these inserts can be displaced and fixed in their position with respect to the camber flap 10 in order to further minimize the play of the individual components with respect to one another. During operation with the blade 1 rotating about the rotor axis RA, centrifugal forces acting on the camber flap and pivotal support thereof are absorbed by the thrust ball bearing 44.

In the case of the embodiment of a rotor blade 1 illustrated in FIG. 2 with a camber flap 10 integrated in the leading edge 2 of the profile, the bearing of the camber flap 10 in the rotor blade 1 by way of the frame 20 and the pins 21, 22 is analogous to the embodiment of FIG. 1.

In this example, the transfer of the longitudinal movement of the control rod 30 to the linking axis A takes place by way of a fork 50 into whose flanks two bolts 51, 52 are screwed in the span direction radially to the outside or inside. The thus formed linking axis A of the control rod 30 is disposed in the camber flap 10 by way two needle bearings 53a, 54a which are in an operative connection with the camber flap 10. For this purpose, the needle bearings 53a, 54a are situated in two inserts 53, 54 which, in turn, are situated in a fitting bore (illustrated by a broken line) of the camber flap 10. A spacer block 50a, which avoids a bending deformation of the flanks at a high tensile load as a result of the forcing lever 30, is situated between the flanks. The supporting of the fork 50 against the centrifugal forces affecting it in the operation takes place by a roller bearing ball 55 which is disposed in the exterior end of the outer bolt 52. This roller bearing ball 55 is disposed in a hollow socket 56 made of synthetic sapphire, which is force-lockingly connected with the camber flap 10.

Also in this embodiment, all components, such as the hollow socket 56, inserts for receiving the roller bearing, are designed as inserts which are accommodated by a bore in the camber flap 10. This ensures a simple mounting and repair.

When two mutually prestressed piezoactuators are used and for reducing the bearing play of the needle bearings, the movement of the control flap in the upward direction can be carried by a control rod with a housing according to FIG. 1, and the movement in the downward direction can be carried out by a control rod with a fork according to FIG. 2. In this case, the two control rods can be guided in one another. As a result of this constellation, it is also possible to integrate the embodiments illustrated in FIGS. 1 and 2, which divert a movement of the control rod to the linking axis, in a control flap. This can take place, for example, by a fork which is wide enough for accommodating a housing together with the bearing eyes according to FIG. 1 between the flanks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Rotor blade for a helicopter having an aerodynamic control flap in the form of a camber flap which is integrated essentially in the contour of the blade profile, is swivellably arranged on an axis of rotation and to which a positively actuated control rod is linked outside the axis of rotation, for converting a linear movement into a swivelling movement of the control flap,
    wherein the control device is supported at the camber flap by way of roller bearings and bolts aligned in a blade span direction, and devices are provided which absorb by way of the control flap centrifugal forces of the control device resulting from the rotation of the rotor blade.
2. Rotor blade according to claim 1,
    wherein the roller bearings are sealed off on a side which is on an outside in a span direction by asymmetrical radial packing rings.
3. Rotor blade according to claim 1,
    wherein the roller bearings are needle bearings.
4. A rotor blade according to claim 1, wherein the positively actuated control device includes two mutually prestressed piezoactuators operable respectfully for moving the control flap in the respective upward and downward directions, one of said piezoactuators being operable to move a control rod connected with a housing, and the other connected with a control rod with a fork configured to accommodate the housing.
5. Rotor blade according to claim 1, wherein the devices for absorbing the centrifugal forces include a roller bearing ball situated in a bolt and a hollow socket supporting the latter.
6. Rotor blade according to claim 5,
    wherein the roller bearing ball consists of steel and the hollow socket consists of synthetic sapphire.
7. Rotor blade according to claim 1,
    wherein the devices for absorbing the centrifugal forces comprises a thrust ball bearing and a prestressed spring for avoiding bearing play mounted between the control device and the control flap.
8. Rotor blade according to claim 7,
    wherein the control device acts upon a bolt by way of a housing with a roller bearing.
9. Rotor blade according to claim 8, wherein the bolt is screwed in flap-side bearing eyes.
10. Rotor blade according to claim 1, wherein the control device acts by way of a two-prong fork upon bolts disposed by way of roller bearings.
11. Rotor blade according to claim 10,
    wherein the bolts are screwed into the fork.
12. Rotor blade according to claim 1,
    wherein the control device acts upon a bolt by way of a housing with a roller bearing.
13. Rotor blade according to claim 12,
    wherein the bolt is screwed in flap-side bearing eyes.
14. Rotor blade according to claim 13,
    wherein the bearing eyes accommodating the hollow socket and/or the bolts or roller bearings are inserts whose contour is designed such that they fit form-lockingly into bores of the control flap.
15. Rotor blade according to claim 5, wherein the radius of the hollow socket is larger than the radius of the roller bearing ball.
16. Rotor blade according to claim 15,
    wherein the roller bearing ball consists of steel and the hollow socket consists of synthetic sapphire.
17. A helicopter rotor blade assembly comprising:
    a blade exhibiting a blade profile,
    a camber flap integrated into the blade profile, and
    a camber flap support assembly operable to support the camber flap in the blade for pivotal adjusting movements about a camber flap axis extending in a blade span direction, and
    a positively actuated transmission mechanism operable to transmit adjusting forces from an adjusting member to the camber flap,
    said transmission mechanism including roller bearings and at least one bolt aligned in the blade span direction and a centrifugal thrust absorber operable to absorb centrifugal forces between the transmission mechanism and the camber flap which result from rotation of the rotor blade.
18. A helicopter rotor blade assembly according to claim 17,
    wherein said transmission mechanism includes a linearly movable control member operable to pivot the camber flap about the camber flap axis.
19. A helicopter rotor blade assembly according to claim 17, the positively actuated transmission mechanism includes two mutually prestressed piezoactuators operable respectfully for moving the control flap in the respective upward and downward directions, one of said piezoactuators being operable to move a control rod connected with a housing, and the other connected with a control rod with a fork configured to accommodate the housing.
20. A helicopter rotor blade assembly according to claim 17,
    wherein the centrifugal thrust absorber includes a thrust bearing disposed between said camber flap and said at least one bolt.

21. A helicopter rotor blade assembly according to claim 20, comprising a prestressed spring operable to avoid bearing play between the transmission mechanism and the camber flap.

22. A helicopter rotor blade assembly according to claim 20,
wherein said camber flap support assembly transmission mechanism includes a linearly movable control member operable to pivot the camber flap about the camber flap axis.

23. A helicopter rotor blade assembly according to clam 20,
wherein the thrust bearing includes a roller bearing ball interposed between an end of the at least one bolt and a hollow socket at the camber flap.

24. Rotor blade for a helicopter having an aerodynamic control flap in the form of a camber flap which is integrated essentially in the contour of the blade profile, is swivellable arranged on an axis of rotation and to which a control rod is linked outside the axis of rotation, for converting a linear movement into a swiveling movement of the control flap,
wherein the control device is disposed by way of roller bearings and bolts aligned in a blade span direction, and devices are provided which absorb by way of the control flap centrifugal forces of the control device resulting from the rotation of the rotor blade;
wherein the devices for absorbing the centrifugal forces include a roller bearing ball situated in a bolt and a hollow socket supporting the latter; and
wherein the radius of the hollow socket is larger than the radius of the roller bearing ball.

25. Rotor blade for a helicopter having an aerodynamic control flap in the form of a camber flap which is integrated essentially in the contour of the blade profile, is swivellably arranged on a axis of rotation and to which a control rod is linked outside the axis of rotation, for converting a linear movement into a swiveling movement of the control flap,
wherein the control device is disposed by way of roller bearings and bolts aligned in a blade span direction, and devices are provided which absorb by way of the control flap centrifugal forces of the control device resulting from the rotation of the rotor blade; and
wherein the roller bearing ball consists of steel and the hollow socket consists of synthetic sapphire.

* * * * *